(12) United States Patent
Morimura et al.

(10) Patent No.: US 8,369,227 B2
(45) Date of Patent: Feb. 5, 2013

(54) MANAGEMENT SYSTEM AND INFORMATION PROCESSING SYSTEM

(75) Inventors: Tomohiro Morimura, Kawasaki (JP); Kiminori Sugauchi, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 614 days.

(21) Appl. No.: 12/529,472

(22) PCT Filed: Mar. 24, 2009

(86) PCT No.: PCT/JP2009/056413
§ 371 (c)(1),
(2), (4) Date: Sep. 1, 2009

(87) PCT Pub. No.: WO2010/109673
PCT Pub. Date: Sep. 30, 2010

(65) Prior Publication Data
US 2011/0265006 A1  Oct. 27, 2011

(51) Int. Cl.
*G01R 31/08* (2006.01)
(52) U.S. Cl. ......... 370/242; 370/248; 370/252; 370/254
(58) Field of Classification Search ............. 370/216, 370/229, 241, 242, 248, 252, 254
See application file for complete search history.

(56) References Cited

U.S. PATENT DOCUMENTS

| 6,249,755 | B1 | 6/2001 | Yemini et al. | |
|---|---|---|---|---|
| 2005/0216785 | A1* | 9/2005 | Suzuki et al. | 714/4 |
| 2007/0014233 | A1* | 1/2007 | Oguro et al. | 370/216 |

FOREIGN PATENT DOCUMENTS

| JP | 07-030540 | | 1/1995 |
|---|---|---|---|
| JP | 08-032607 | A | 2/1996 |
| JP | 11-004223 | A | 1/1999 |
| JP | 2005-269238 | A | 9/2005 |
| JP | 2006-222808 | A | 8/2006 |
| JP | 2006-229421 | A | 8/2006 |

OTHER PUBLICATIONS

Kato, N. et al., "A Proposal and Evaluation of network Fault Management Supporting System by Integrating Management Information", *IEICE Transactions on Communication*, vol. J83-B, No. 9, pp. 1258-1266, Sep. 2000.

* cited by examiner

*Primary Examiner* — Yemane Mesfin
*Assistant Examiner* — Mon Cheri Davenport
(74) *Attorney, Agent, or Firm* — Foley & Lardner LLP

(57) ABSTRACT

Provided is a management system for managing a plurality of management target information processing apparatuses including a plurality of network apparatuses and a computer. This management system determines the reachability of a route network apparatus as a network apparatus on a communication between the system and the computer, and calculates a certainty factor concerning the certainty on whether a prescribed network apparatus contained in a route network apparatus based on the reachability is the cause of unreachability from the management system to the computer. The management system subsequently displays information showing that communication from the management system to the computer is unreachable, and the certainty factor as the certainty that the prescribed route network apparatus is the cause of unreachability.

20 Claims, 24 Drawing Sheets

FIG.7

```
> snmpwalk -c public 192.168.1.1 dot1dTpFdbAddress
17.4.3.1.1.0.0.12.7.186.4 = Hex-String: 00 00 0C 07 BA 04
17.4.3.1.1.0.1.2.27.25.145 = Hex-String: 00 01 02 1B 19 91
                          :
```

FIG.8

```
> snmpwalk -c public@1 192.168.1.1 dot1dTpFdbPort
17.4.3.1.2.0.0.12.7.186.4 = 11
17.4.3.1.2.0.1.2.27.25.145 = 11
                    ⋮
```

FIG.9

```
> snmpwalk -c public@1 192.168.1.1 dot1dBasePortIfIndex
17.1.4.1.2.11 = 2
17.1.4.1.2.12 = 3
               ⋮
```

FIG.10

```
> snmpwalk -c public@1 192.168.1.1 ifName
ifMIB.ifMIBObjects.ifXTable.ifXEntry.ifName.1 = VL1
ifMIB.ifMIBObjects.ifXTable.ifXEntry.ifName.2 = Fa0/16
```

FIG.13

ANALYSIS RESULT LIST 211

NETWORK APPARATUS (SW-43) FAILURE
FAILURE CAUSE CERTAINTY FACTOR: ☆☆☆☆☆ (100%)
ROOT CAUSE:
CRASH OF THE APPARATUS SW-43 MAY BE THE CAUSE.
RELATED RECEPTION EVENT:
COMMUNICATION UNREACHABLE SW-43 INTERFACE: Fa0/16 2008/12/05 12:50:33...

NETWORK APPARATUS (SW-41) FAILURE
FAILURE CAUSE CERTAINTY FACTOR: ☆☆☆☆☆ (75%)
ROOT CAUSE:
CRASH OF THE APPARATUS SW-41 MAY BE THE CAUSE.
RELATED RECEPTION EVENT:
COMMUNICATION UNREACHABLE SW-41 INTERFACE: Fa0/16 2008/12/05 12:50:34...
COMMUNICATION UNREACHABLE SW-43 INTERFACE: Fa0/16 2008/12/05 12:50:33...

FIG.17

| APPARATUS NAME | NIC NAME | MAC ADDRESS |
|---|---|---|
| MANAGEMENT SERVER 1 | eth0 | 00 00 87 07 BA 01 |
| SW-40 | Fa0/16 | 00 00 0C 0A EA A0 |
| ... | ... | ... |
| SW-40 | Fa0/16 | 00 00 0C 03 3E 05 |
| ... | ... | ... |
| SW-40 | Fa0/16 | 00 00 0C E0 31 09 |
| ... | ... | ... |

C11, C12, C13 label the columns. 110, L10, L11, L12, L13 label the rows.

FIG.18

| | C21 | C22 | C23 |
|---|---|---|---|
| 111 | APPARATUS | INTERFACE | LEARNING MAC ADDRESS LIST |
| L20 | SW-40 | Fa 0/16 | 00 00 87 07 BA 01, 00 00 87 31 0F 9C, ... |
| L21 | SW-40 | Fa 0/16 | 00 00 87 05 3E E0, 00 00 87 2A 14 53, ... |
| | ⋮ | ⋮ | ⋮ |

FIG.19

| TARGET APPARATUS | ROUTE APPARATUS LIST |
|---|---|
| SW-40 | SW-42 |
| SW-41 | SW-40, SW-42 SW-43 |
| SW-42 | – |
| SW-43 | SW-40, SW-42 |
| COMPUTER 44 | SW-40, SW-41, SW-42, SW-43 |
| SW-45 | SW-40, SW-42 |
| ⋮ | ⋮ |

| | APPARATUS NAME (C41) | INTERFACE NAME (C42) | COMMUNICATION STATUS (C43) |
|---|---|---|---|
| L41 | SW-43 | Fa0/16 | REACHABLE |
| | ⋮ | ⋮ | ⋮ |
| L42 | SW-43 | Fa0/16 | UNREACHABLE |
| | ⋮ | ⋮ | ⋮ |
| L43 | SW-43 | Fa0/16 | REACHABLE |
| | ⋮ | ⋮ | ⋮ |
| L44 | SW-43 | Fa0/16 | UNREACHABLE |
| | ⋮ | ⋮ | ⋮ |

| | ANALYSIS ID | ANALYSIS TIME | CAUSE APPARATUS | CAUSE LOCATION | CERTAINTY FACTOR | RECEPTION EVENT LIST |
|---|---|---|---|---|---|---|
| L51 | A | 2008.12.25··· | SW-43 | Fa0/16 | 100 | SW-43_UR_01 |
| L52 | B | 2008.12.25··· | SW-41 | Fa0/16 | 75 | SW-43_UR_01, SW-41_UR_01 |
| | ··· | ··· | ··· | ··· | ··· | ··· |

Columns: C51, C52, C53, C54, C55, C56 — Table 114

FIG.22

$$\text{FAILURE CAUSE CERTAINTY FACTOR} = \frac{\text{UNREACHABLE (TARGET APPARATUS)} + \Sigma \text{ REACHABLE (ON ROUTE APPARATUS)}}{(\text{NUMBER OF APPARATUSES} + 1 \text{ ON ROUTE BETWEEN MANAGEMENT SERVER AND TARGET APPARATUS})} \times 100$$

PROVIDED, HOWEVER THAT REACHABLE (APPARATUS)··· FUNCTION OF RETURNING ARGUMENT APPARATUS IS REACHABLE FROM MANAGEMENT SERVER/SOURCE IP NODE: 1, NOT REACHABLE: 0
UNREACHABLE (APPARATUS)··· FUNCTION OF RETURNING ARGUMENT APPARATUS IS UNREACHABLE FROM MANAGEMENT SERVER/SOURCE IP NODE: 1, REACHABLE: 0

(ii) SW-41

FAILURE CAUSE CERTAINTY FACTOR = (UNREACHABLE (SW-41) + REACHABLE (SW-40) + REACHABLE (SW-42) + REACHABLE (SW-43))/((SW-41) + (SW-40) + (SW-42) + (SW-43)) × 100 = ((1 + 1 + 1 + 0)/4) × 100 = (3/4) × 100 = 75%

MANAGEMENT SYSTEM AND INFORMATION PROCESSING SYSTEM

TECHNICAL FIELD

The technology disclosed herein relates to an information processing system including a server computer, a network apparatus, and a storage apparatus, as well as to a management system for managing such an information processing system.

BACKGROUND ART

In recent years, information processing systems are becoming complex and large-scale by mutually coupling various types of information processing apparatuses via a computer network (hereinafter simply referred to as a "network"). In connection with this, a failure that occurred in a certain information processing apparatus is affecting the various other information processing apparatuses via the network. As root cause analysis technology for identifying the location and cause of these failures, there is event correlation technology which analyzes the failure location and cause using the event information representing the failure content that is notified from the information processing apparatus (for instance, refer to the specification of U.S. Pat. No. 6,249,755).

The event correlation technology estimates the root cause by utilizing the correlation of events that occur at the time of the failure, and has been used from the past to diagnose the failure of a network system. In addition, analysis of a network failure is mostly related to communication at an IP level as a network layer which is the third layer of the OSI reference model, and the failure analysis method that combines the collection of topology information based on ICMP (Internet Control Message Protocol) and ARP (Address Resolution Protocol), and SNMP (Simple Network Management Protocol) is mainstream (for instance, refer to the transactions of the Institute of Electronics, Information and Communication Engineers Vol. J83-B, No. 9, pp. 1258-1266, "A Proposal and Evalustion of Network Fault Management Supporting System by Integrating Management Information").

DISCLOSURE OF THE INVENTION

In a computer network that communicates using a second layer data link layer (Layer-2: hereinafter abbreviated as L2) in the OSI reference model concerning a network failure, there are cases where it is not possible to obtain, with the management protocol, the detailed information of the network topology in the Layer-2 such as the coupling priority of the Layer-2 switch (hereinafter referred to as the L2 switch) in the communication route (for instance, SNMP). And if a failure occurs where communication does not reach the information processing apparatus as the destination apparatus, there is a problem in that it is difficult to promptly identify the network switch that is the cause of such failure.

Thus, the present invention estimates the failure on a communication route in the L2 and the possibility of a network switch among the route network switches being the cause apparatus based on information concerning the existence of the L2 switch on the route, and displays information regarding the cause apparatus based on the estimated result. Incidentally, the information display regarding the cause apparatus may be such that identifiers are displayed with the apparatus estimated as being likely to be the cause apparatus with a high priority (for instance, in descending order from the most likely apparatus).

According to the present invention, it is possible to promptly identify the network switch that was subject to a failure.

BRIEF DESCRIPTION OF THE DRAWINGS

FIG. 7 is a diagram showing an example of an acquisition command of the L2 switch port by the SNMP or the MAC address to the VLAN and its output result;

FIG. 8 is a diagram showing an example of an acquisition command of a bridge port number to the MAC address of the L2 switch by the SNMP and its output result;

FIG. 9 is a diagram showing an example of an acquisition command of an index number of the network interface to the bridge port number of the L2 switch by the SNMP and its output result;

FIG. 10 is a diagram showing an example of an acquisition command of an interface name corresponding to the index number of the network interface of the L2 switch by the SNMP and its output result;

FIG. 13 is a diagram showing an example of a screen output upon displaying the analysis result on the screen;

FIG. 17 is a diagram showing the network interface MAC address information;

FIG. 18 is a diagram showing the learning MAC address information;

FIG. 19 is a diagram showing the route information;

FIG. 20 is a diagram showing the communication status information;

FIG. 21 is a diagram showing the analysis result information;

FIG. 22 is a diagram showing a calculation formula for seeking the failure cause certainty factor;

BEST MODE FOR CARRYING OUT THE INVENTION

Figure 1:
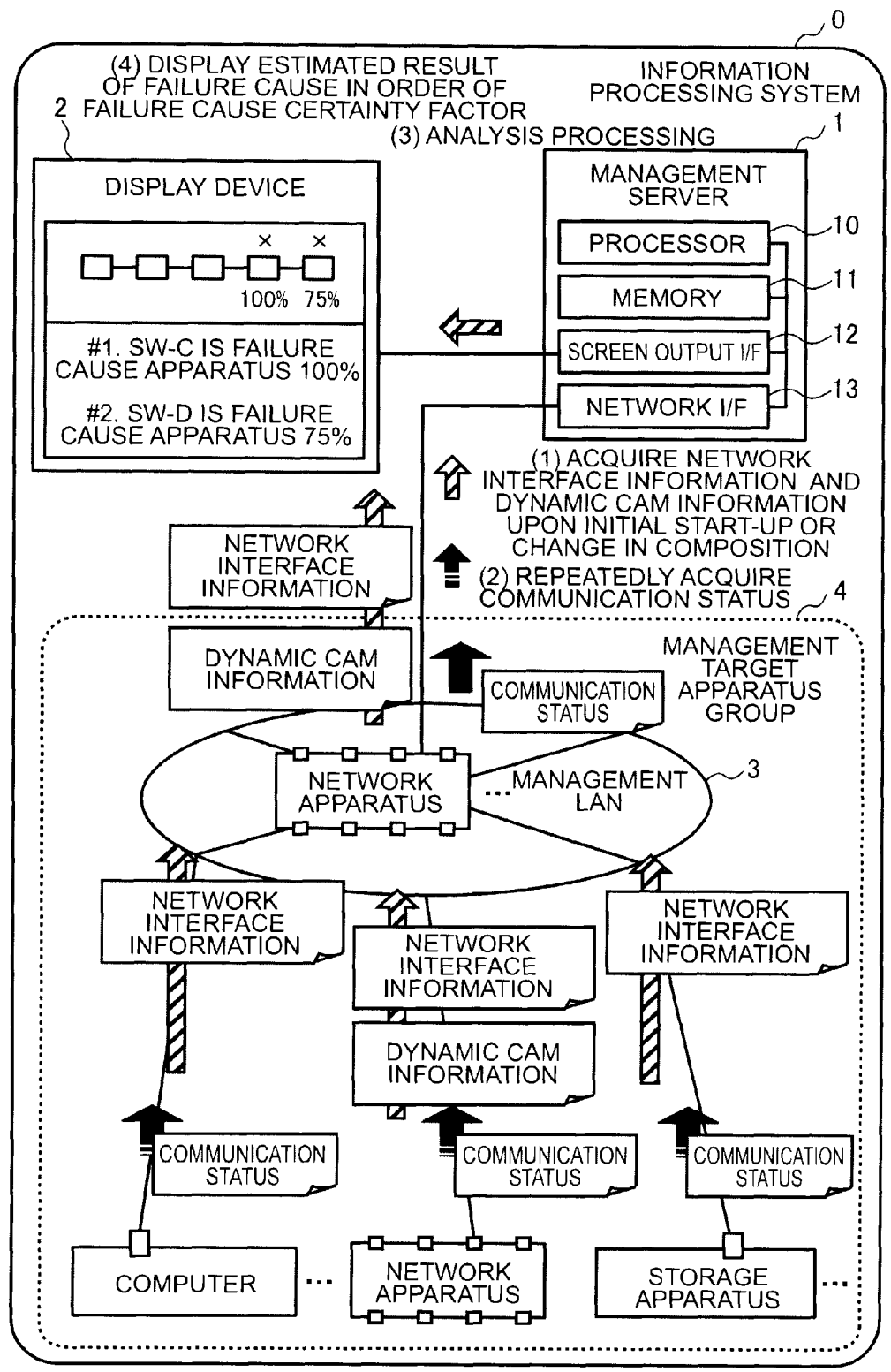
FIG. 1 is a typical overview diagram showing the overall composition of the information processing system.

The present invention is now explained in detail.

Incidentally, as one embodiment of the present invention, there is an information processing system that provides a formula of evaluating the failure on the communication route in the L2 and the possibility of a network switch among the route network switches being the cause apparatus only with information concerning the existence of switches on the route that can be comprehended based on information within the scope that can be collected from MIB-II, Bridge-MIB or the like as the standard management model of SNMP, and outputs apparatuses, in order, which are most likely the cause apparatus to the screen.

As a separate embodiment of the present invention, provided is a management system for managing a plurality of management target information processing apparatuses including a plurality of network apparatuses and a computer. This management system comprises a network interface for receiving management information from the computer, a processor for determining the status of the computer based on the management information, a memory for storing the status of the computer, and a display device for displaying the status of the computer. With this management system, the processor identifies one or more route network apparatuses as network apparatuses on a communication route of the network interface and the computer from the plurality of network apparatuses, the processor determines one or more reachabilities by communicating with the identified one or more route network apparatuses via the network interface, and records the one or more reachabilities in the memory, the processor calculates a first certainty factor concerning the certainty on whether a first route network apparatus contained in the one or more route network apparatuses identified based on the one or more reachabilities is the cause of unreachability from the network interface to the computer, and the display device displays information showing that communication from the network interface to the computer is unreachable, and the first certainty factor as the certainty that the first route network apparatus is the cause of unreachability.

Incidentally, the identified one or more route network apparatuses include a switch device for transferring, without changing a destination address of a received packet, the received packet to another network apparatus or a computer, and the identification of the one or more route network apparatuses may be based on information of a switch device including a MAC address of the packet that was transferred with the switch device, a MAC address of the network interface, and a MAC address of the computer.

Moreover, information of the switch device does not have to include information for identifying an adjacent switch device.

Further, the processor may calculate a second certainty factor concerning the certainty on whether a second route network apparatus contained in the one or more route network apparatuses identified based on the one or more reachabilities is the cause of unreachability from the network interface to the computer, and the display device may display information showing that communication from the network interface to the computer is unreachable, and the second certainty factor as the certainty that the second route network apparatus is the cause of unreachability at a lower visual priority than the first certainty factor.

(A) With the left end and/or the upper end of a screen of the display device as a reference, the display of the low visual priority is closer to a location on the screen where a display object showing the first certainty factor or the first route network apparatus than a location on the screen where a display object showing the second certainty factor or the second route network apparatus is displayed.

(B) The display of the low visual priority is such that the size of a display object showing the second route network apparatus on the screen is larger than the size of a display object showing the first route network apparatus on the screen.

(C) The display of the low visual priority is such that the degree of enhancement of a display object showing the second route network apparatus on the screen is higher than the degree of enhancement of a display object showing the first route network apparatus on the screen.

Moreover, the processor may calculate the number of reachable network apparatuses included in the identified one or more route network apparatuses and determined as being reachable based on the reachability determination, and, if the number of the calculated reachable network apparatuses is two or more, the display device may display a group display object showing that display objects showing the two or more reachable network apparatuses have been grouped.

Further, if the first certainty factor is higher than the second certainty factor, the display device may display a display object representing that the first network apparatus is coupled from the grouped two or more display objects, and a display object representing that the second route network apparatus is coupled from the grouped two or more display object via the first route network apparatus.

Moreover, information showing whether it is unreachable from the management system to the computer, identifying information of the first network apparatus, and display of the first certainty factor by the display device may additionally display that they are related to the reception of the management information.

Consequently, according to the present invention, with respect to a failure of a network switch having the Layer-2 switch function existing on the route between certain information processing apparatuses, even if the coupling order of the route network switch is unclear, it is possible to present to the user, in order, suspicious network switches that are considered to be the failure cause easily, without having to go through the trouble of seeking the coupling priority based on calculation, while using only collectible apparatus information that is normally supported in SNMP. Moreover, the present invention can also be applied under an environment where certain switches are able to provide the coupling priority to the management server with a special protocol. However, the foregoing features and advantages are merely examples, and it should not be acknowledged that the other sections do not merit patentability.

In the ensuing explanation, the information of the present invention will be explained through expressions such as "xxx table," "xxx list," "xxx DB" or "xxx queue," but such information may also be represented other than the data structures of table, list, DB or queue. Thus, in order to show that the information is not dependent on a data structure, "xxx table," "xxx list," "xxx DB," "xxx queue" and the like are sometimes referred to as "xxx information."

Moreover, upon explaining the subject matter of each piece of information, expressions such as "identifying information," "identifier," "title," "name," "ID" and "number" are used, but these expressions are not limited to physical existences such as apparatuses and components, and are mutually exchangeable since they are also allocated to differentiate logical existences.

In the ensuing explanation, the term "program" is used as the subject in the explanation. However, since a program performs prescribed processing by being executed with the processor while using a memory and an interface, the explanation may also be made by using "processor" as the subject. Moreover, the processing that is disclosed with the program as the subject may also be processing to be performed by a computer such as a management server, or an information processing apparatus. Moreover, a part or all of the program may be realized with dedicated hardware.

In addition, the various types of programs may be installed in the respective computers with a program distribution server or a storage media.

<1. Composition of Information Processing System>

FIG. 1 is an overview diagram showing one composition of the information processing system according to the first embodiment of the present invention. The information processing system 0 comprises a management server 1, a display device 2 for displaying the screen output data created with the management server 1, and a management target apparatus group 4. The management server 1 monitors and manages, as the management target, the information processing apparatus including a computer, a network switch (NW switch), and a storage apparatus configuring the management target apparatus group 4.

The management server 1 comprises a memory 11 as an area for storing information as electronic data, a processor 10 for performing processing to analyze failures that occurred on a computer network using the electronic data existing in the memory 11, a network interface 13 (the term "interface" is sometimes abbreviated as "I/F") for sending and receiving electronic data to and from the management target apparatus group 4 via the computer network of the management LAN 3, and a screen output interface 12 for outputting data to be displayed on the display device 2. The memory 11 may be a semiconductor memory as a main memory, or a magnetic disk device as an auxiliary memory, or an external storage apparatus. The management LAN 3 does not have to be a network that is limited to a local area. The management LAN 3 may be a network that is different from the network for conducting the communication between the information processing apparatuses, or may be partially or completely the same network.

Figure 16:
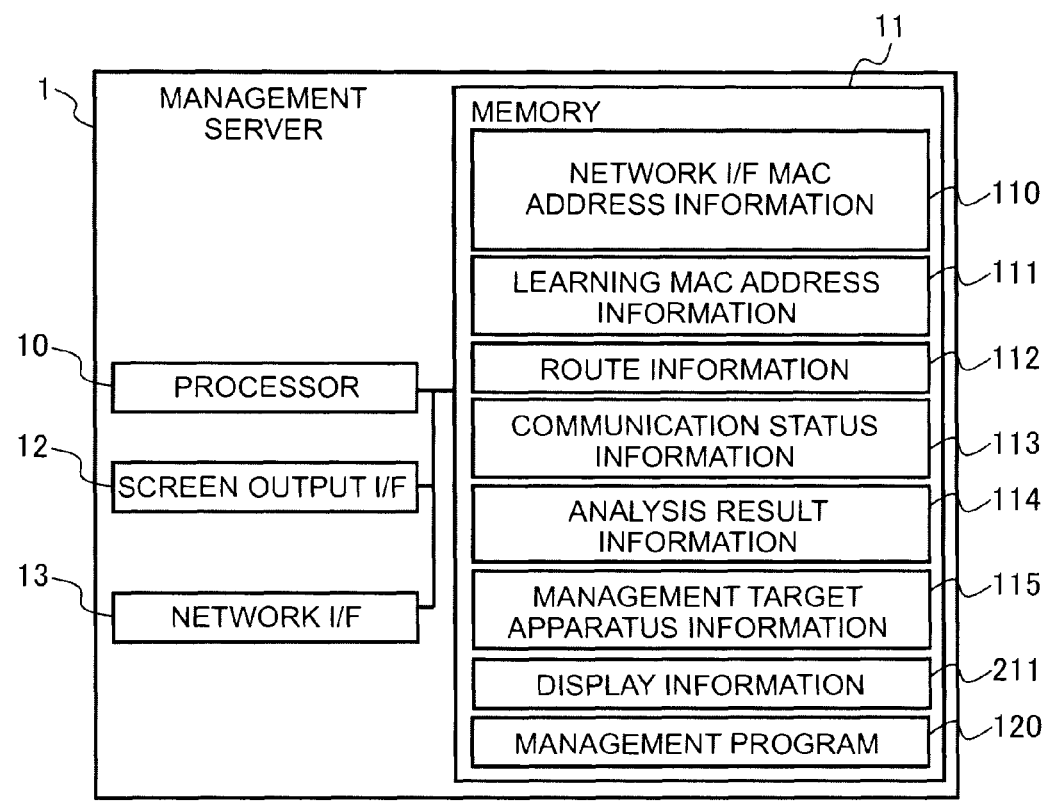
FIG. 16 is a typical diagram showing the composition of the management server of the present invention.

FIG. 16 is a typical diagram showing the information and programs to be stored in the memory 11 of the management server 1.

The memory 11 includes management target apparatus information 115 containing an apparatus name concerning the management target apparatus group 4 that is provided in advance to the management service 1 in the information processing system 0, as well as identifying information and authentication information required for making access on the computer network, network interface MAC (Media Access Control) address information 110 and learning MAC address information 111 that are created upon starting up the system or changing the composition, route information 112 to be created based thereon, communication status information 113 for storing the communication status of information processing apparatus 4 configuring the management target apparatus group 4 that was collected periodically and in fixed intervals (or repeatedly without regard to the cycle) while monitoring the management target apparatus group 4, analysis result information 114 for storing the result of the analysis processing that was performed by the processor 10, display information 211 to be created based on the analysis result information, and a management program 120. Incidentally, the information and programs stored in the memory 11 will be explained in detail later with reference to flowcharts and information diagrams.

Returning to the explanation of FIG. 1, the management target apparatus group 4 comprises a computer as a management target apparatus, an information processing apparatus including a storage apparatus, and a network apparatus existing in the management LAN 3 that couples the information processing apparatus as the management target apparatus and the management server 1. The management server 1 collects network interface information from all management target apparatuses during the initial start-up of a computer as the information processing apparatus, a network apparatus and a storage apparatus configuring the management target apparatus group 4 or when the composition of the management target apparatus group 4 is changed, and collects dynamic CAM information as information of switches regarding the Layer-2 switches that perform the packet transfer based on control of the Layer-2 data link layer in the management target apparatus. The network interface information and the dynamic CAM information do not need to be re-collected unless the composition of the management target apparatus group 4 is changed, but may be collected upon confirming the existence of such change in relatively long intervals such as once a day. Meanwhile, the reachability from the management server 1 to the management target computer, network apparatus, and storage apparatus is determined by repeating the communication for determining the reachability to such networks, and the result is stored in the communication status information 113 of the memory 11. Incidentally, the network apparatus is the foregoing Layer-2 switch. Preferably, the management server 1 collects the dynamic CAM information and the network interface information before the communication for determining the network reachability, but this is not a necessity.

Incidentally, in the ensuing explanation the computer, storage apparatus, or network apparatus configuring the management target apparatus group 4 may sometimes be referred to as a management target apparatus or a management target information processing apparatus.

As described above, the management server 1 may also include another input/output device to be coupled to the display device 2. As examples of the input/output device, considered may be a display, a keyboard, and a pointer device, but it may be other devices. As a substitute for the input/output device, a serial interface or an Ethernet interface may be used as the input/output device, and a display computer including such display or keyboard or pointer device may be coupled to the foregoing interface, and it is possible to send display information to the display computer, display input information on the display computer by receiving it from the display computer, and input and display with the input/output device by receiving input. Needless to say, the management server 1 may also have the display device built therein.

Subsequently, the aggregate of one or more computers to manage the information processing system 0 and display the display information of the present invention is hereinafter called the management system. When the management server 1 is to display the display information, the management server 1 is the management system, and the combination of the management server 1 and the display computer is the management system. Moreover, a plurality of computers may be used to realize the same processing as the management server 1 in order to perform the management processing faster and more reliably, and in the foregoing case such plurality of computers (including the display computer when using the display computer for the display) are the management system.

<1.1. Definitions>

The definitions of the terms used herein are provided below. Incidentally, terms are defined in other sections of this specification. Information processing apparatus: Apparatus for sending and receiving network communication (for instance, server apparatus, storage apparatus, printer, scanner, etc.), and an apparatus for relaying the network communication (router, proxy server, switch).

Monitoring target information processing apparatus: Information processing to be monitored by the management server 1.

Certainty factor: Value representing the certainty that a certain event has occurred, which is calculated with the formula based on reachability described later.

<2. Information Owned by Information Processing System or Management Server>

Prior to explaining the information owned by the management server 1, an example of the management LAN 3 (hereinafter referred to as the management LAN 3 example) which assumes a specific value that is stored in the respective pieces of information and lists is explained with reference to FIG. 2.

In the management LAN 3 example, the communication route from the management server 1 to the computer 44 is coupled in the coupling order from SW-42 of the L2 switch to SW-40, SW-43 and SW-41. Incidentally, unless specifically indicated herein, let it be assumed that a failure occurred in the SW-43.

Incidentally, the foregoing explanation does not mean that the various pieces of information store only these values, and does not limit the composition of the management LAN 3.

The various types of information of the management server 1 are now explained.

<2.1. Management Target Apparatus Information>

The management target apparatus information 115 (FIG. 16) is information for storing the identifier of the management target apparatus to be managed by the management server 1. This identifier may be an identifier for communicating with the management target apparatus; for instance, an IP address. Other identifiers may also be used so as long as it is possible to ultimately communicate with the management target apparatus.

<2.2. Network Interface MAC Address Information>

FIG. 17 is a diagram showing the network interface MAC address information 110. The network interface MAC address information 110 includes, as its record, an apparatus name C11 as a column for entering the name to be used in identifying the management target apparatus, an NIC name C12 as a column for entering the network interface name to be used for identifying the network interface (NIC, sometimes referred to as a network interface card), and a MAC address C13 as a column for entering the MAC address that is allocated to the network interface. The foregoing information does not necessarily have to be in the form of a table.

<2.3. Learning MAC Address Information>

FIG. 18 is a diagram showing the learning MAC address information 111.

The learning MAC address information 111 includes, as its contents, an apparatus C21 as a column for storing information to be used in identifying the apparatus regarding a plurality of L2 switches included in the management target apparatus group 4, an interface column C22 as a column for storing the interface name to be used in identifying the network interface of the apparatus, and a learning MAC address list C23 as a column for storing a list of MAC address included in the transit packets that were learned by the interface for routing in the Layer-2. The foregoing information does not necessarily have to be in the form of a table.

<2.4. Route Information>

FIG. 19 is a diagram showing the route information 112.

The route information 112 includes, as its contents, a target apparatus C31 as a column for storing identifying information of the management target information processing apparatus as the destination of communication from the management server 1, and a route apparatus list C32 as a column for storing, as a list, identifying information of the information processing apparatus existing on the communication route of the management server 1 and the target apparatus. The foregoing information does not necessarily have to be in the form of a table.

<2.5. Communication Status Information>

FIG. 20 is a diagram showing the communication status information 113. The communication status information 113 includes, as its contents, an apparatus name C41 as a column for storing information that is used in identifying the management target apparatus, an interface name C42 as a column for storing information that is used in identifying the network interface in the apparatus, and a communication status C43 as a column for storing whether the communication from the management server 1 to the network interface is reachable which shows that is it communicable, or unreachable which shows that it is not communicable. The foregoing information does not necessarily have to be in the form of a table.

<2.6. Analysis Result Information>

FIG. 21 is a diagram showing the analysis result information 114.

The analysis result information 114 includes, as its contents, an analysis ID C51 as a column for storing the identifier to be uniquely identified in relation to the analysis result, an analysis time C52 as a column for storing the analysis time, a cause apparatus C53 for storing the apparatus that is assumed to be the cause apparatus in the analysis, a cause location C54 as a column for storing the location of the apparatus that is assumed to be the cause of the failure, a certainty factor C55 as a column for storing the certainty factor of the cause that is assumed in the analysis, and a reception event list C56 as a column for storing related failure notice information used in the analysis.

<2.7. Display Information>

Figure 12:
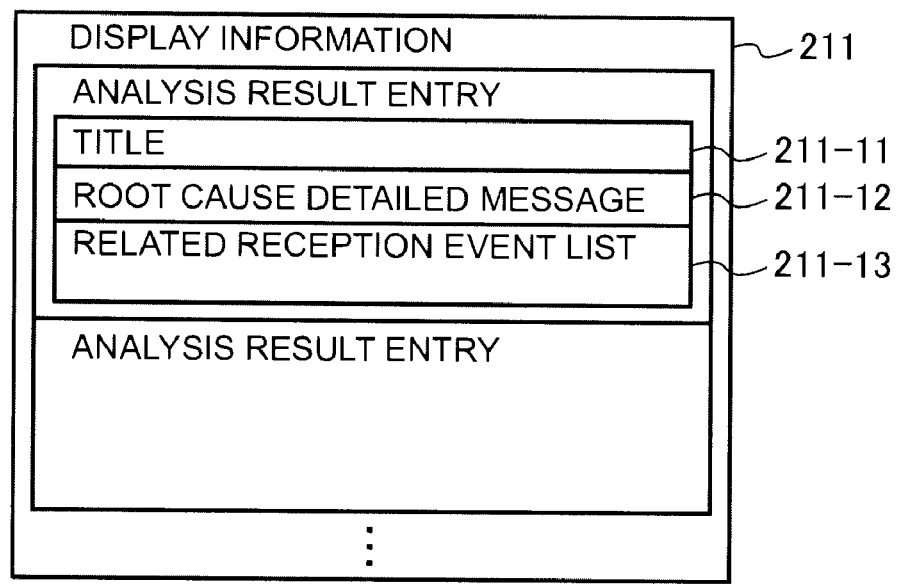
FIG. 12 is a typical diagram showing an example of a screen output layout upon displaying the analysis result on the screen.

FIG. 12 is a diagram showing the display information 211.

The display information 211 includes, as its contents, one or more analysis result entries that correspond one-to-one with one record of the analysis result information. The analysis result entry is configured from a title 211-11 configured from a character string that represents the abstract of the analysis result and information showing the certainty factor representing the certainty of the analysis result, a root cause detailed message 211-12 as a detailed message concerning the root cause, and a related reception event list 211-13 based on the communication status that was used in calculating the certainty factor. Incidentally, although preferably the display information 211 includes of the above in order to alleviate the difficulty of operation by the administrator, it may also include only a part of the foregoing contents. In addition, it may also other information.

<2.8. Management Program>

The management program 120 is a program for managing the status of the monitoring target information processing apparatus. The management program 120, in addition to performing the foregoing processing and the processing to be explained later, manages the status of the monitoring target information processing apparatus (for instance, the occurrence of a failure, configuration change by the apparatus, status concerning performance, etc.), and displays the same on the display device 2. Thus, for example, the management program 120 performs the following.

(A) Receive management information (for instance, the occurrence of a failure, configuration information and performance information of the apparatus, etc.) from the monitoring target information processing apparatus via the network interface 13.

(B) Determines the foregoing status based on the received management information and displays it on the display device 2.

Incidentally, the management program 120 may also receive a configuration request to the monitoring target information processing apparatus received by the management server 1, and perform configuration to the monitoring target information processing apparatus based on such request.

<3. Information to be Acquired by Management Server>

The information to be acquired by the management server 1 is now explained.

<3.1. Dynamic CAM information>

Figure 4:
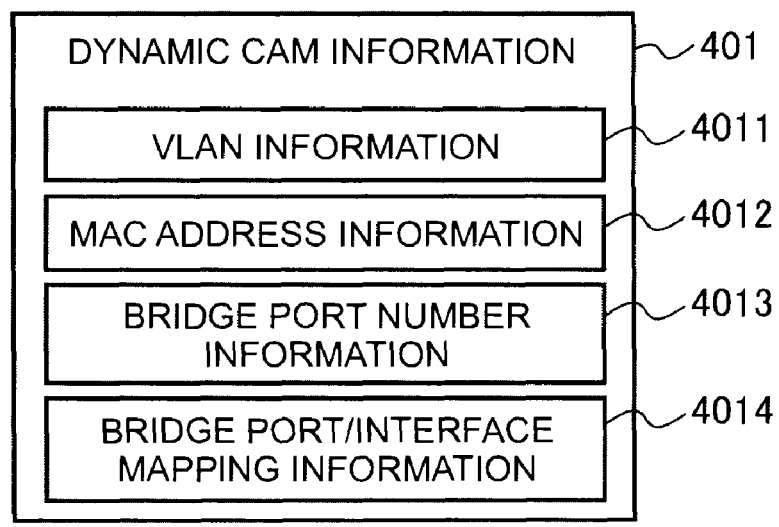
FIG. 4 is a typical diagram showing dynamic CAM information to be acquired by the management server from the L2 switch.

FIG. 4 is a diagram showing the dynamic CAM information 401 to be received by the management server 1.

The dynamic CAM information 401 is configured from VLAN information 4011 as information concerning the VLAN number to the port of the network interface of the L2 switch, a MAC address information 4012 showing the MAC address of the port belonging to a certain VLAN number, a bridge port number information 4013 showing the bridge port number corresponding to the obtained MAC address, and a bridge port/interface mapping information 4014 concerning the correspondence between the obtained bridge port number and the name of the network interface.

The dynamic CAM information 401 does not necessarily have to obtain all of the foregoing information and contents with a single command. An example of a specific command for acquiring the dynamic CAM information 401 is described below.

<3.1.1. Acquisition of Dynamic CAM Information using SNMP>

The MAC address information 4012 can be acquired based on the output result of the SNMP command shown in FIG. 7.

The bridge port number information 4013 can be acquired based on the output result of the SNMP shown in FIG. 8.

The bridge port/interface mapping information 4014 can be acquired based on the output result of the SNMP command shown in FIG. 10 after obtaining the correspondence of the port number and the interface index value in the SNMP command shown in FIG. 9.

<3.1.2. Acquisition of Dynamic CAM Information without using SNMP>

The dynamic CAM information 401 can be acquired with a "show mac" command with CISCO's IOS switch, and with a "show cam dynamic" command with a CatOS switch.

<3.2. Network Interface Information>

The network interface information is information to be received by the management server 1 from the management target apparatus. The network interface information includes, as its contents, an apparatus name (or identifier) of the management target apparatus, a name (or identifier) of the network interface of the management target apparatus, and a MAC address and/or IP address (or another communication identifier) allocated to the network interface. The foregoing information does not necessarily have to be acquired in a single communication.

<4. Processing and Display of Management Server>

The management program 120 of the management server 1 is now explained.

<4.1. Acquisition of Information>

The routine of the management server 1 acquiring network interface information from the one or more management target information processing apparatuses based on the management target apparatus information 115, additionally acquiring dynamic CAM information regarding the network apparatus in the management target information processing apparatus, and thereby creating or updating the network interface MAC address information 110, the learning MAC address information 111, and the route information 112 is now explained.

Figure 3:
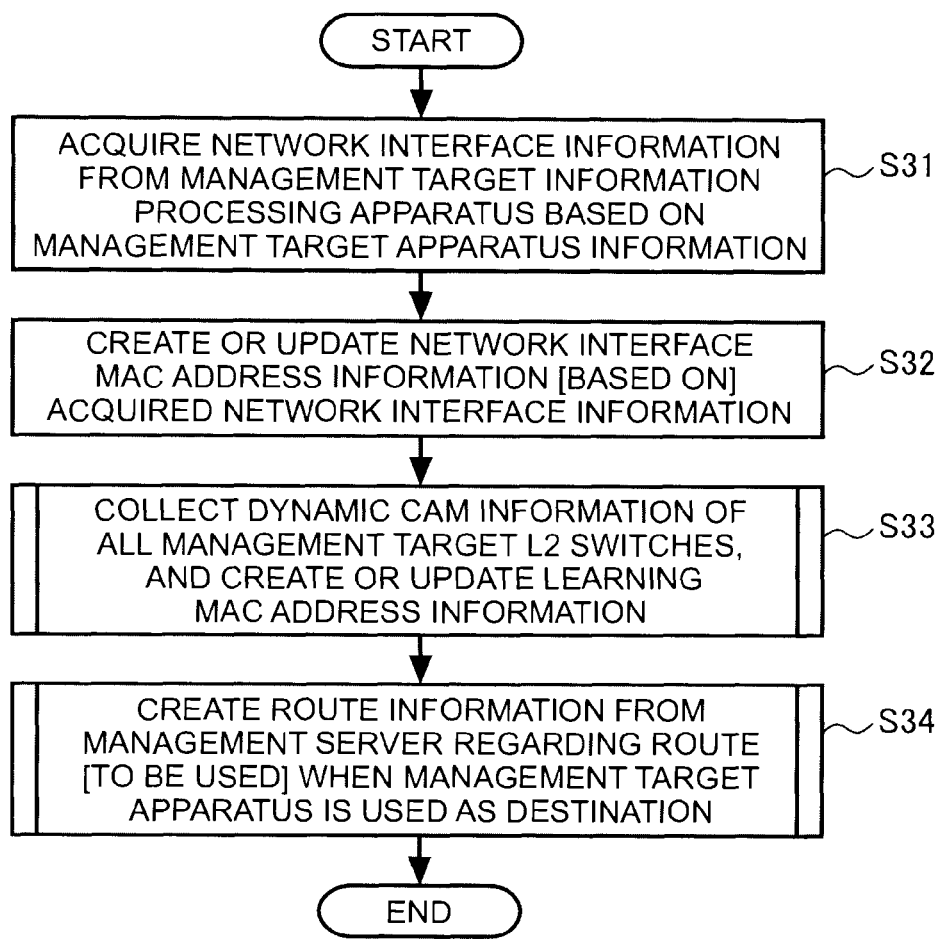
FIG. 3 is a flowchart showing the processing flow for creating network interface MAC address information, learning MAC address information, and route information.

FIG. 3 shows the preparation processing routine to be performed by the management program 120 when initially starting up the information processing system 0, or when the composition of the management target apparatus group 4 of the information processing system 0 is changed. Incidentally, this routine may be performed at a timing that is designated by the administrator. This flow is now explained flow.

(step S31) The management program 120 acquires network interface information from one or more information processing apparatuses registered in the management target apparatus information 115 of the management server 1.

(step S32) The management program 120 creates or updates the network interface MAC address information 110 based on the acquired network interface information. Incidentally, an example of such creation or update is to register all or a part of the contents, which is contained in the network interface information, in the network interface MAC address information 110.

(step S33) The management program 120 receives the dynamic CAM information 401 from the one or more L2 switches contained in the management target apparatus group 4, and updates or creates the learning MAC address information 111. Incidentally, an example of such creation or update is to register all or a part of the contents, which is contained in the dynamic CAM information 401, in the learning MAC address information 111.

(step S34) The management program 120 creates the route information 112 regarding the route from the management server 1 (more specifically, the network interface 13 of the management server 1) to the management target information processing apparatus as the communication destination.

Figure 5:
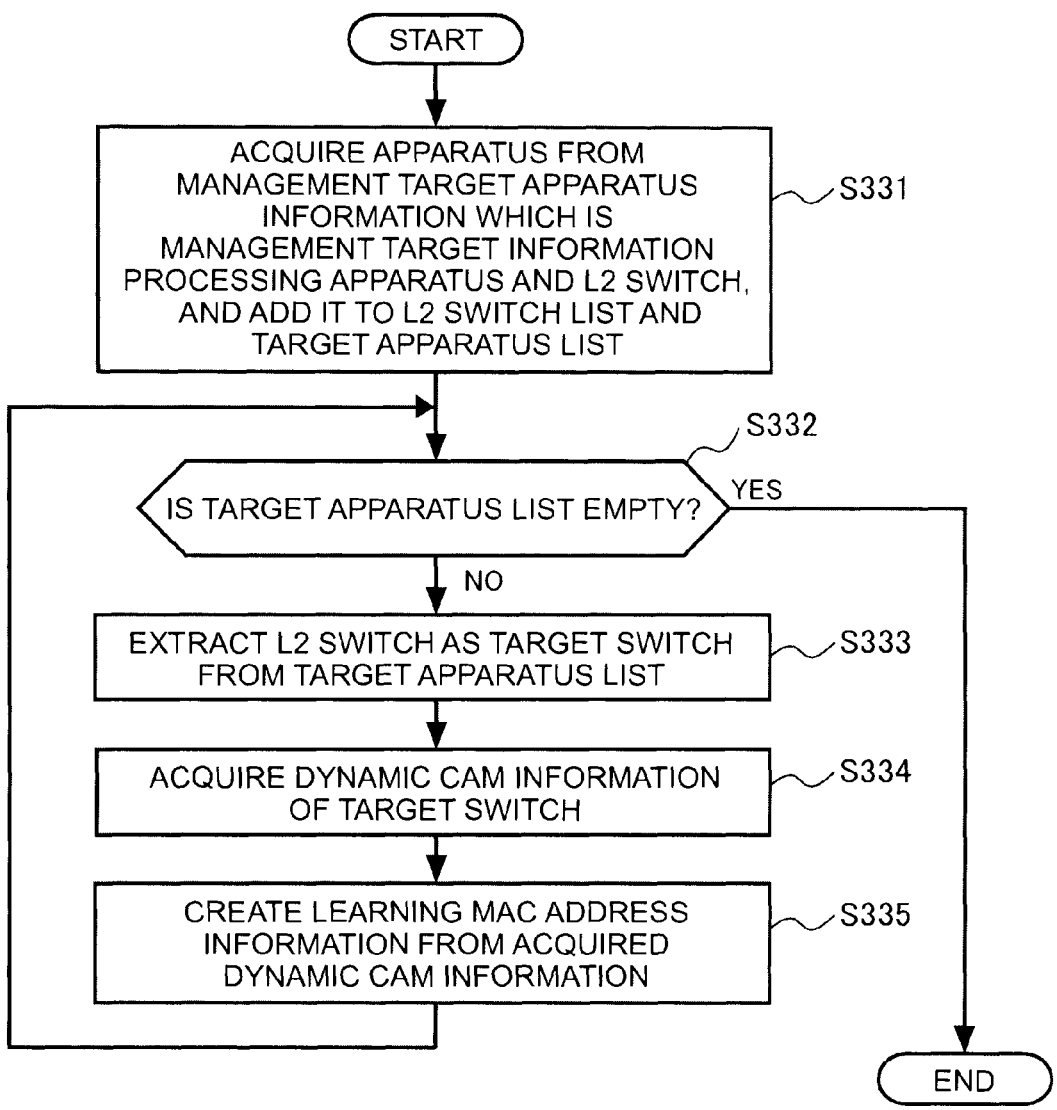
FIG. 5 is a flowchart showing the detailed processing flow for creating the dynamic CAM information of the flow illustrated in FIG. 3.

FIG. 5 shows a detailed routine of the processing upon the management program creating the learning MAC address information 111 at step S33 of FIG. 3. This is now explained with reference to the flow of FIG. 5.

(step S331) The management program 120 extracts an apparatus that is a management target information processing apparatus and also an L2 switch from the management target apparatus information 115, and adds this to the L2 switch list and the target apparatus list. Incidentally, the target apparatus list is information that is temporarily created in the memory 11 during this routine. Moreover, since the L2 switch list is to be used in the flow of FIG. 6, it must be temporarily created in the memory 11 during the routine of FIG. 6. Nevertheless, the respective lists may also still be stored in the memory 11 after the end of this routine.

(step S332) The management program 120 determines whether the target apparatus list is empty. If the target apparatus list is not empty in the determination at step S332, the routine proceeds to step S333. Meanwhile, if the target apparatus list is empty, this routine is ended and the processing of step S34 in FIG. 3 is performed.

(step S333) The management program 120 extracts the L2 switch from the target apparatus list as the target switch.

(step S334) The management program 120 acquires the dynamic CAM information of the extracted target switch.

(step S335) The management program 120 creates or updates the learning MAC address information 111 from the received dynamic CAM information, and once again returns to step S332.

Figure 6:
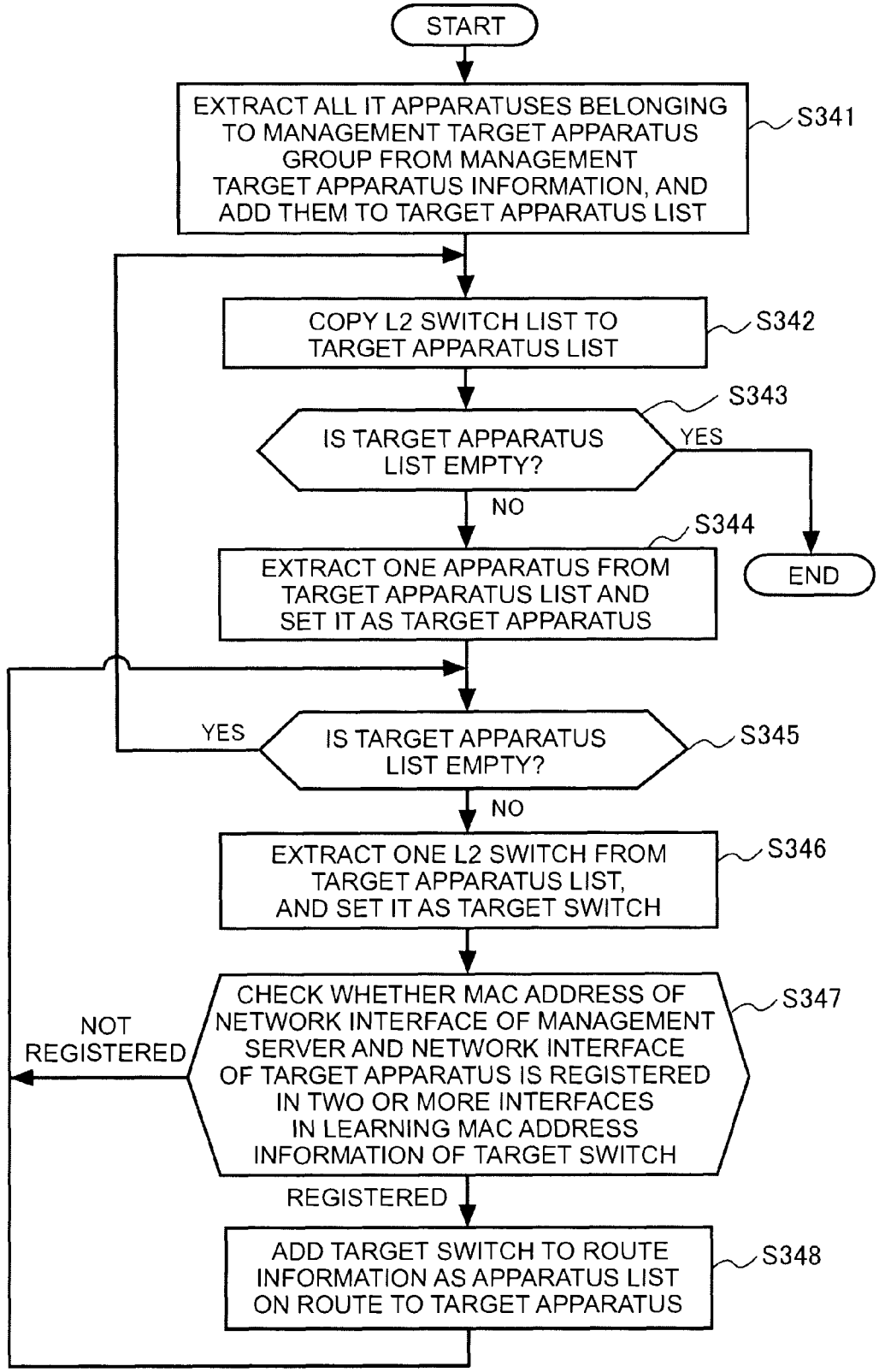
FIG. 6 is a flowchart showing the detailed processing flow for creating the route information of the flow illustrated in FIG. 3.

FIG. 6 shows the detailed routine of the processing for creating the route information 112 at step S34 in FIG. 3. This is now explained according to the flow of FIG. 6.

(step S341) The management program 120 adds an information processing apparatus belonging to the management target apparatus group 4 to the target apparatus list based on the management target apparatus information 115. Incidentally, the target apparatus list is information that is temporarily created in the memory 11 during this routine, but it may also still be stored in the memory 11 after the end of this routine.

(step S342) The management program 120 registers all L2 switches, which were registered in the L2 switch list created at step S33, in the target apparatus list.

(step S343) The management program 120 confirms whether the target apparatus list is empty, and proceeds to step S344 if it is not empty, and ends the processing if it is empty.

(step S344) The management program 120 extracts one apparatus from the target apparatus list and sets it as a target apparatus.

(step S345) The management program 120 confirms whether the target apparatus list is empty, and returns to step S341 if it is empty, and proceeds to step S346 if it is not empty.

(step S346) The management program 120 extracts one L2 switch from the target apparatus list and sets it as a target switch.

(step S347) The management program 120 checks whether the MAC addresses of the network interface of the management server 1 and the network interface of the target apparatus are respectively registered in two or more interfaces in the learning MAC address information 111 of the target switch by using the network interface MAC address information 110, and proceeds to step S348 if it is registered, and returns to step S345 if it is not registered.

(step S348) The management program 120 registers the target switch in the route information 112.

The route information 112 is created according to the foregoing routine. Incidentally, in the management LAN 3 example illustrated in FIG. 2, the route information 112 shows that, as with L31, SW-42 of the L2 switch exists on the route of the management server 1 and the target apparatus SW-40. Similarly, with L32, it shows that SW-40, SW-42 and SW-43 of the L2 switch exist on the route of the management server 1 and the target apparatus SW-41. Results of setting other L2 switches as the target apparatus are also sought as shown in FIG. 19.

An example of this routine using the command shown in FIG. 7 to FIG. 10 is now explained.

FIG. 7 shows an example of an acquisition command of the MAC address allocated to the port of the L2 switch by the SNMP, and its output result, and shows that "00 00 0C 07 BA 04" and "00 01 02 1B 19 91" and the like can be acquired as the MAC address of the apparatus representing the switch in which the IP address is "192.168.1.1."

FIG. 8 shows an example of a command for acquiring the bridge port number belonging to the VLAN number 1 of the L2 switch by the SNMP, and its output result, and shows that the bridge port number in relation to the MAC address "00 00 0C 07 BA 04" is "11."

FIG. 9 shows a command for acquiring the interface index number of the network interface in relation to the bridge port number of the L2 switch by the SNMP, and its output result, and shows that the index number of the network interface to the bridge port number 11 is "2."

FIG. 10s shows a command for acquiring the index number of the network interface of the L2 switch by the SNMP and the interface name in relation to the index number, and its output result, and shows that the interface name of the index 11 is "Fa0/16."

Based on the output results of FIG. 7, FIG. 8, FIG. 9, and FIG. 10, it is possible to know that the MAC address that was learned in a port showing "Fa0/16" as the interface name of the L2 switch is "00 00 0C 07 BA 04." Specifically, this shows that the packet having as its destination the information processing apparatus having a network interface with "00 00 0C 07 BA 04" as the MAC address has passed through the port of "FA0/16." Based on this information, in which port of the L2 switch the MAC address, which has the network interface of the information processing apparatuses at both ends of the communication route, has been learned is checked, and, if the information processing apparatuses at both ends are respectively learned in different ports of the same L2 switch, it is evident that the switch exists midway in the route.

<4.2. Analysis>

Figure 11:
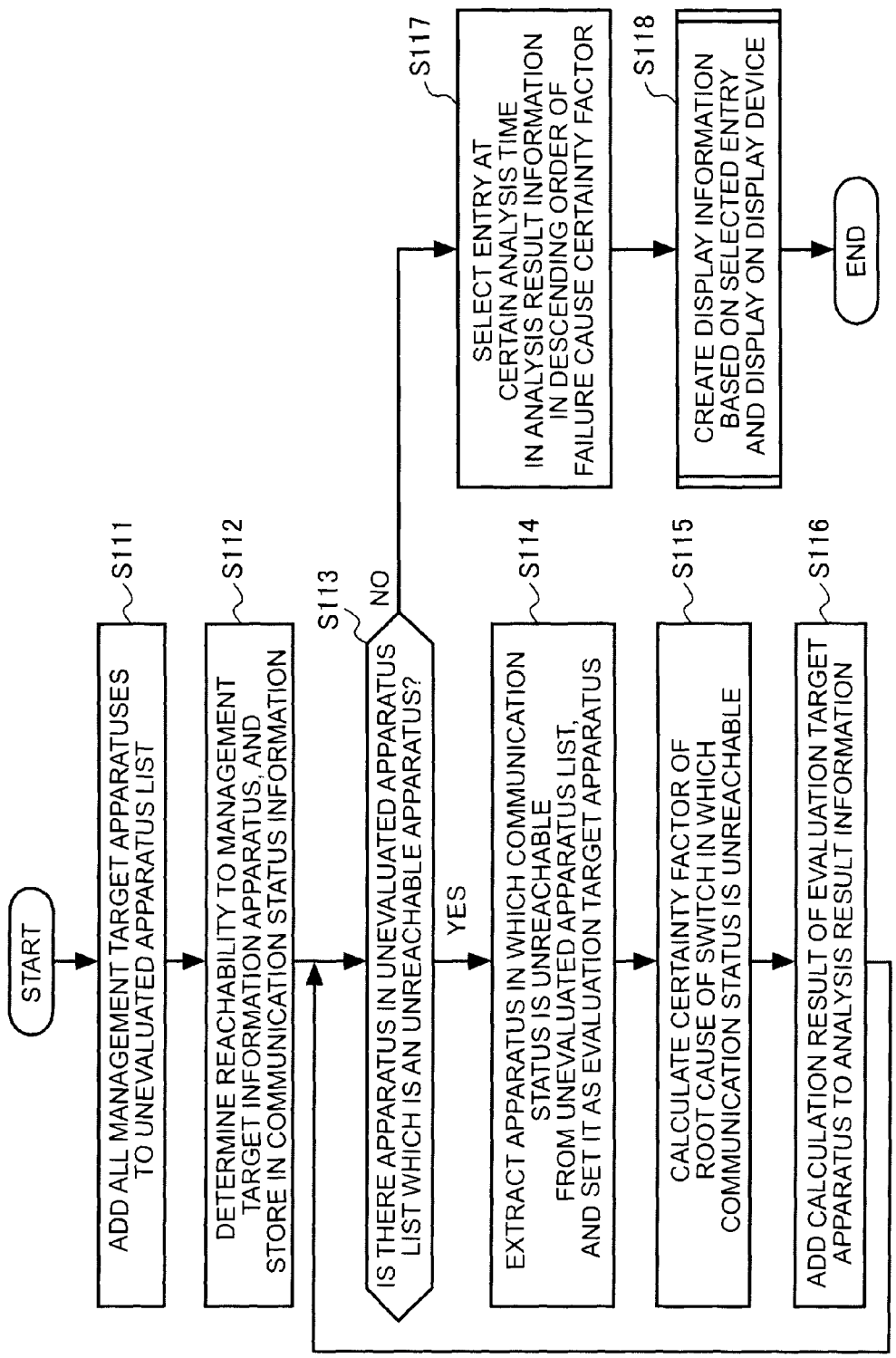
FIG. 11 is a flowchart showing the processing flow of analyzing the cause apparatus of the failure of the communication route, and the processing flow of outputting the analysis result to the screen.

FIG. 11 shows the routine of the failure analysis processing to be repeated after the information processing system starts monitoring the management target apparatus group 4, and to the display of the analysis result. Incidentally, the display of the analysis result may be performed at an independent timing from the failure analysis. Moreover, this routine may be started or ended at the timing that the management server receives a command from the administrator.

(step S111) The management program 120 adds all management target information processing apparatuses registered in the management target apparatus information 115 to the unevaluated apparatus list. Incidentally, the unevaluated apparatus list is information to be temporarily created in the memory 11 during this routine. However, the unevaluated apparatus list may still be stored in the memory 11 even after the end of this routine.

(step S112) The management program 120 determines whether the communication to the management target information processing apparatus registered in the management target apparatus information 115 is reachable showing that it is communicable, or unreachable showing that it is not communicable, and stores the apparatus name (or apparatus identifier) and the interface name (or interface identifier or MAC address of the interface) as well as the determination result in the communication status information 113. Incidentally, examples of the determination method of the communication status are shown below (it is not necessary to adopt all methods).

(Determination method 1) Issue information acquisition command by the SNMP and determine from its response.

(Determination method 2) Determine based on a failure notice of link down or the like that is listed in the SNMP trap or the like.

(Determination method 3) Determine based on response of ICMP's "ping" command.

Incidentally, among the foregoing determination methods, there may be a situation where an L2 switch that is determined as unreachable even though in reality a failure has not occurred, as a result of performing communication for determining whether a failure has occurred via an L2 switch subject to a failure other than the L2 switch in which a failure has actually occurred. Thus, the following steps are performed.

(step S113) The management program 120 determines whether there is even one management target information processing apparatus that was determined as unreachable among the management target information processing apparatuses that are registered in the unevaluated apparatus list. The management program 120 proceeds to step S114 if such an apparatus exists, and proceeds to step S117 if such an apparatus does not exist. Incidentally, this determination is made based on the communication status information 113. In the management LAN 3 example of FIG. 2, since SW-41 and SW-43 are determined as unreachable, the routine proceeds to step S114.

(step S114) The management program 120 extracts the one or more management target information processing apparatuses in which the communication status was determined to be unreachable from the unevaluated apparatus list, and sets each of such apparatus as the evaluation target apparatus. In the management LAN 3 example of FIG. 2, SW-41 or SW-43 is extracted from the unevaluated apparatus list and set as the evaluation target apparatus.

Figure 23:
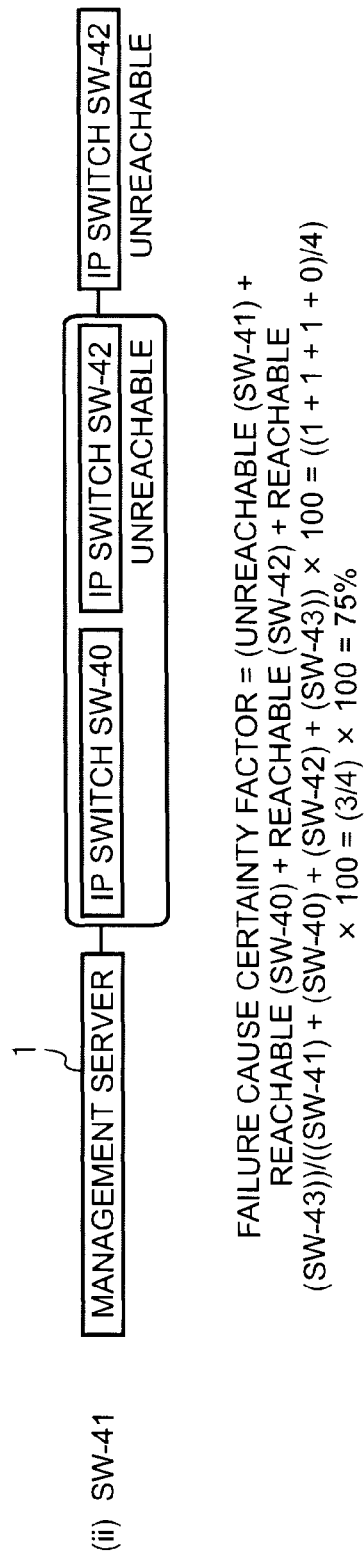
FIG. 23 is a diagram showing the relationship of the formula for calculating the failure cause certainty factor in a case where a prescribed switch is subject to a failure in the example of FIG. 2, and the L2 switch.
Figure 24:
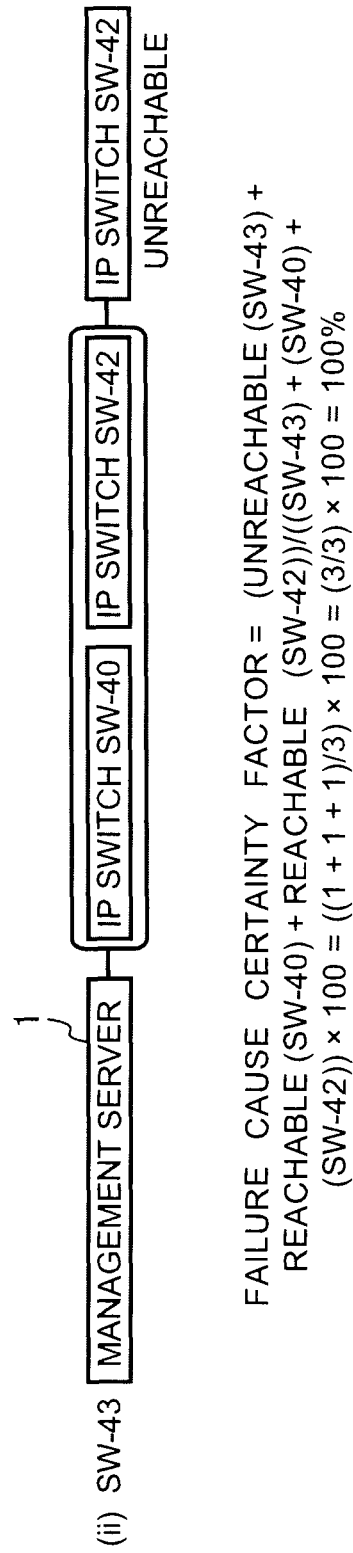
FIG. 24 is a diagram showing the relationship of the formula for calculating the failure cause certainty factor in a case where another prescribed switch is subject to a failure in the example of FIG. 2, and the L2 switch.

(step S115) The management program 120 seeks the failure cause certainty factor showing the possibility that the evaluation target apparatus is a cause apparatus of the network route failure based on the formula of FIG. 22 based on the reachability against the evaluation target apparatus. In the management LAN 3 example of FIG. 2, the failure cause certainty factor in the case of SW-41 is 75% as shown in FIG. 23. The failure cause certainty factor with the evaluation target apparatus as SW-43 is 100% as shown in FIG. 24, and is the result with the highest possibility that the SW-43 is the cause apparatus.

(step S116) The management program 120 updates the analysis result information 114 as follows.
(A) Analysis time: Register the date and/or time that this routine was performed.
(B) Cause apparatus and cause location: Register the identifying information of the evaluation target apparatus that was selected in the unreachable determination and the interface of the evaluation target apparatus.
(C) Reception event list: Register the identifying information showing the unreachable status of communication of the one or more management target information processing apparatuses determined to be unreachable on the route from the management server 1 to the evaluation target apparatus.

Figure 2:
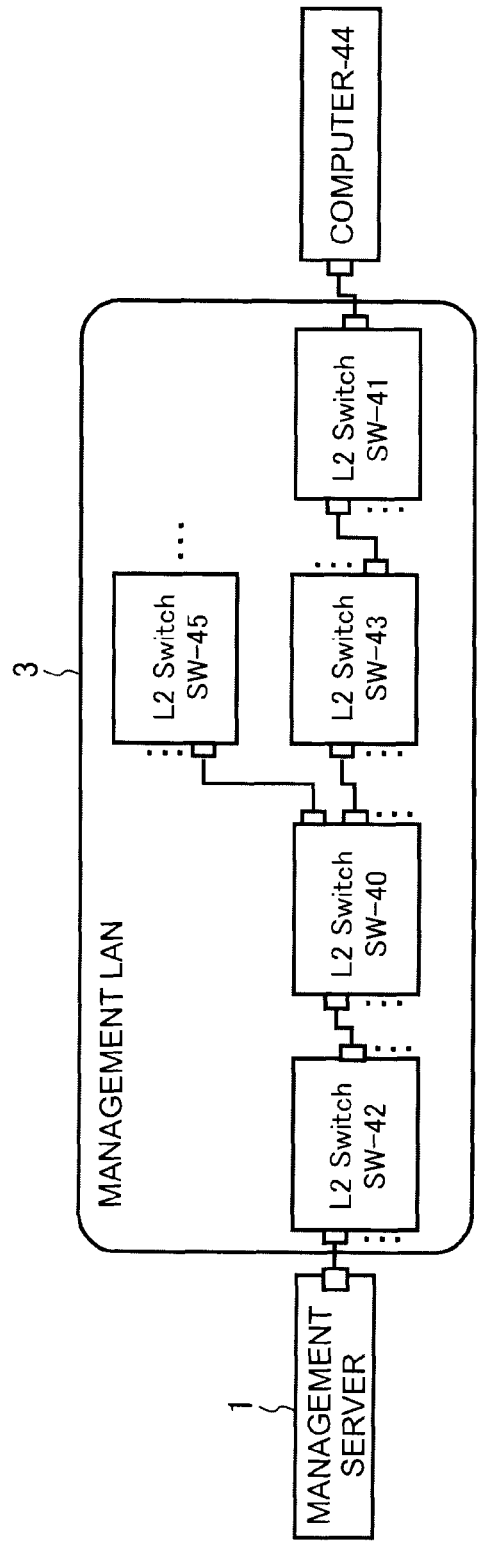
FIG. 2 is a typical diagram showing an example of a management LAN.

In the management LAN 3 example of FIG. 2, the analysis result of identifying SW-43 in which the communication status is unreachable as the cause apparatus is as shown in L51, and the cause location is the interface Fa01/32, the failure cause certainty factor is 100%, and the related reception event list is registered as the unreachable communication status information in SW-43. SW-41 similarly registered as the record of L52.

(step S117) The management program 120 selects records, in descending order of the failure cause certainty factor, regarding the entries of the analysis result information 114 at a certain analysis time. Incidentally, the selection may be such that only the entries in which the failure cause certainty factor is above a prescribed value are selected, or only up to a certain entry set forth in descending order. In the management LAN 3 example of FIG. 2, L51 and L52 are selected.

(step S118) The management program 120 creates the display information 211 (FIG. 16) based on the records of the analysis result information 114 (FIG. 16) in which the failure cause certainty factor was selected in descending order at step S117, and sends the created display information 211 to the display device 2 via the screen output interface 12. The display device 2 makes a display on the management screen based on the display information 211. An example of creating the display information 211 is shown below.
(A) Title: Register a message to the effect that the cause apparatus and cause location indicated in the column C53 and the column C54 of FIG. 21 are the cause of failure together with the certainty factor of the column C55.
(B) Root cause detailed message: Register a message to the effect that the cause apparatus and cause location indicated in the column C53 and the column C54 of FIG. 21 are the cause of failure.
(C) Related reception event list: Register a character string capable of identifying the related management target information processing apparatus converted into a character string that is discernable by the administrator from the identifier or name of the management target information processing apparatus (more preferably the L2 switch) that is registered in the reception event list of the column 56 of FIG. 21.

In the management LAN 3 example of FIG. 2, as a result of display the kind of information shown in FIG. 13, it will be possible for the administrator know that a failure has potentially occurred in both SW-41 and SW-43, but narrow it down to SW-43 as the cause apparatus since it has a higher certainty factor.

<4.3. Display of Analysis Result>

Figure 14:
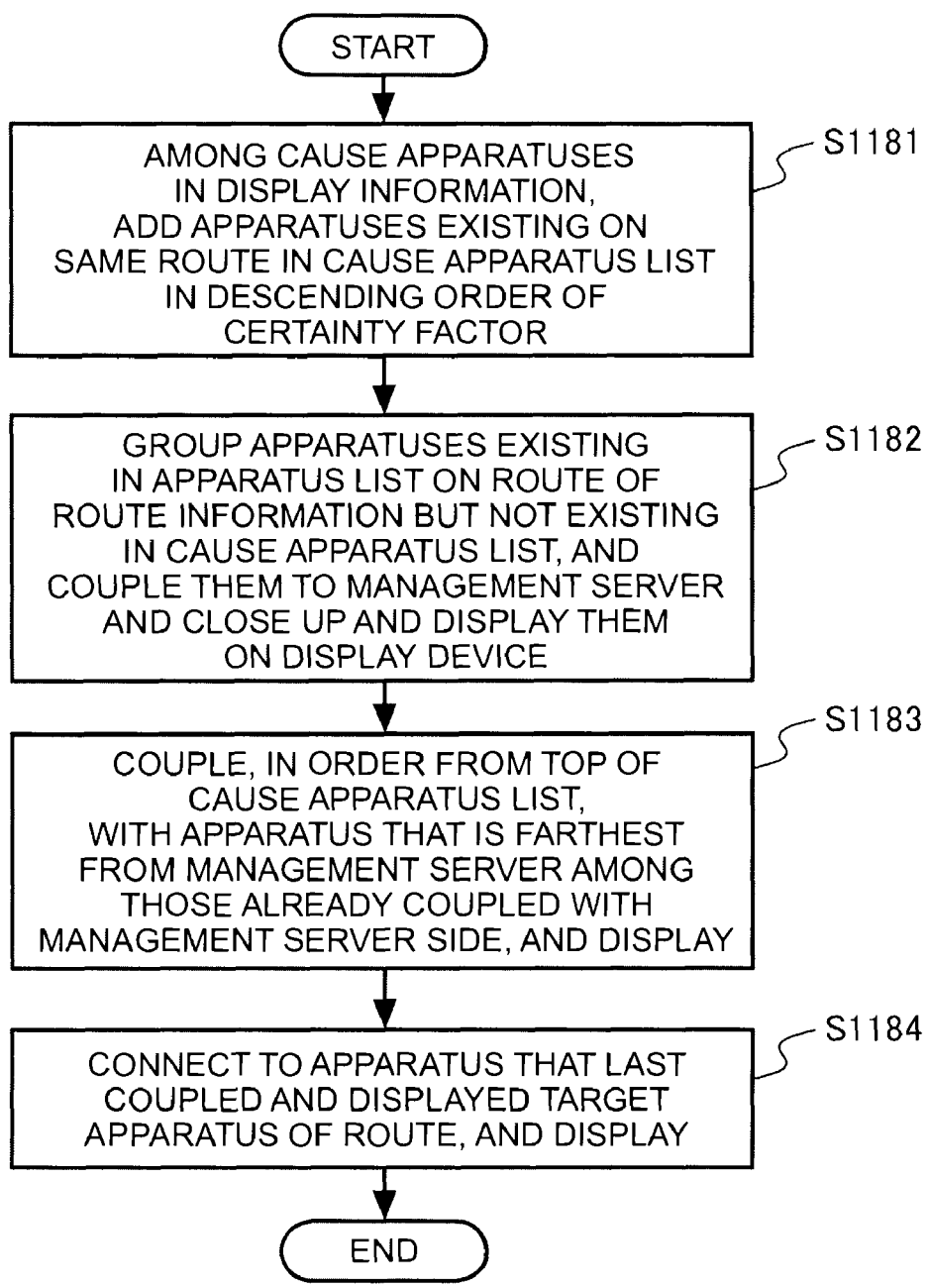
FIG. 14 is a flowchart showing the processing flow of estimating the communication route based on the analysis result and outputting the topology display on the screen.

FIG. 14 shows the processing flow of additionally making a topology display within an estimatable range in the communication route in L2 by using the display information 211 at step S118 of the foregoing screen display processing described with reference to FIG. 11. Incidentally, this display may be made at an independent timing than the analysis processing of FIG. 11. In the foregoing case, a request of screen display may be received from the administrator, and the display may be made with such request as the trigger. This is now explained along the following flow.

(step 1181) The management program 120, among the routes subject to a communication failure based on the route information 112 (FIG. 16 and FIG. 19), adds an apparatus that is a cause apparatus and also a communication route apparatus based on the display information 211 (FIG. 16) to the cause apparatus list in descending order of the certainty factor. Incidentally, the cause apparatus list is information that is temporarily created in the memory 11 during this routine. However, this list may still be stored in the memory 11 even after the end of this routine. In the management LAN 3 example of FIG. 2, SW-43 and SW-41 are added to the cause apparatus list regarding the communication route as the failed route from the management server 1 to the computer 44.

(step S1182) The management program 120 notifies, via the screen output interface 12, the display device to group the apparatuses that exist in the route apparatus list of the route information 112 and the apparatuses that do not exist in the cause apparatus list and represents the group as a single box, and couple with the management server 1 and close up and display it from the end. Upon receiving the notice, the display device 2 groups the apparatuses that exist in the route apparatus list of the route information 112 and the apparatuses that do not exist in the cause apparatus list and represents the group as a single box, and couples it with the management server 1, and closes up and displays it from the end. In the management LAN 3 example of FIG. 2, since SW-40 and SW-42 correspond, these are grouped in a single box, coupled with the management server 1, and closed up and displayed from the left end of the screen. Incidentally, although this does not have to be the left end of the screen, the display is made from the far end of the screen.

(step S1183) The management program 120 notifies, via the screen output interface 12, the display device 2 to display the cause apparatus list in order from the top by coupling it with the apparatus that is farthest from the management server 1 of the apparatus that is already coupled from the management server 1 side. Upon receiving the notice, the display device 2 displays the cause apparatus list in order from the top by coupling it with the apparatus that is farthest from the management server 1 of the apparatus that is already coupled from the management server 1 side. In the management LAN 3 example of FIG. 2, since SW-43 has the highest certainty factor as the cause apparatus, this is foremost coupled with the box grouping SW-40 and SW-42 coupled to the management server 1, and SW-41 is coupled to the right side of SW-43 and displayed.

(step S1184) The management program 120 notifies, via the screen output interface 12, the display device 2 to couple and display the route target apparatus on the far side when viewed from the management server 1 of the apparatus that is the farthest from the management server 1 that was last coupled and displayed. Upon receiving the foregoing notice, the display device 2 couples and displays the route target apparatus on the far side when viewed from the management server 1 of the apparatus that is the farthest from the management server 1 that was last coupled and displayed. In the management LAN 3 example of FIG. 2, the computer 44 is coupled to the right side of SW-43 and displayed.

Figure 15:
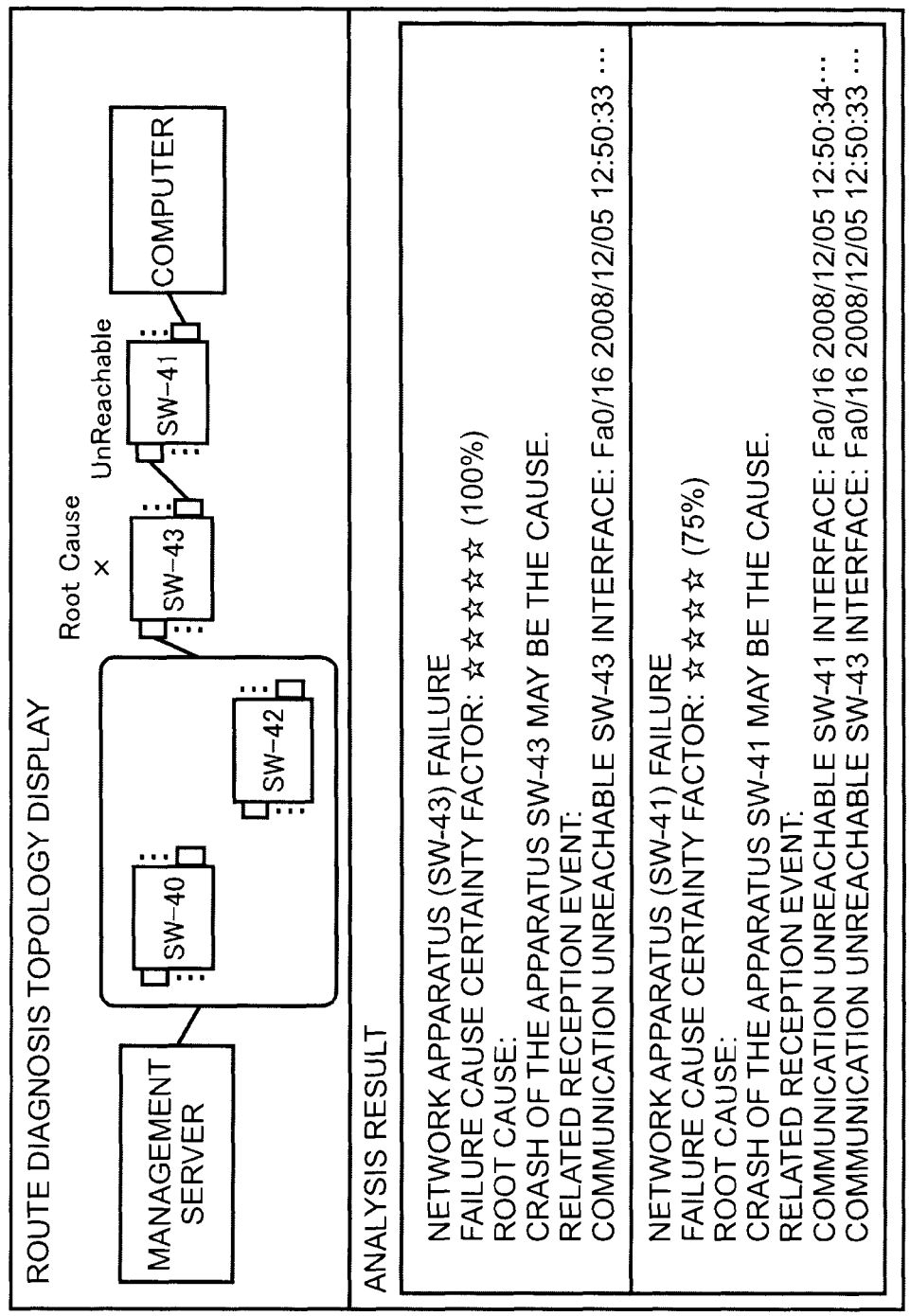
FIG. 15 is a diagram showing an example of a screen output of the communication route in the form of a topology display in the first embodiment of the present invention.

Based on foregoing step S1181 to step S1184, the coupling priority of the L2 switch of the communication route subject to a failure shown in FIG. 15 is displayed on a screen in a form of being partially clarified. As described above, not only will it be possible to narrow down the switches on the route in order of certainty as the cause apparatus, it will also be possible to clarify, to a certain degree, the coupling priority of the failed communication route based on the foregoing information.

<4.4. Screen Display>

FIG. 15 is a diagram showing an example of the screen display.

This screen displays information showing that the communication from the network interface 13 to the computer is unreachable (for instance, "X" is displayed to show that a failure has occurred in the identified switch), and a certainty factor calculated as the certainty that the route network apparatus is the cause of unreachability. Moreover, the screen displays information based on the display information. The screen then displays the identifying information and the certainty factor of the network apparatus (more preferably the switch device) subject to the calculation. Incidentally, as shown in the example of FIG. 15, when considering a case of calculating and displaying the certainty factor of a plurality of network apparatuses, if assuming that the certainty factor (first certainty factor) of the first route network apparatus is higher than the certainty factor (second certainty factor) of the second route network apparatus, in order to improve the visibility, the second certainty factor may be displayed with a lower visual priority than the first certainty factor. Examples of the visual priority are provided below, but other methods may be employed to provide the visual priority.

(A) Display information or a display object such as an icon of a route network apparatus having a high certainty factor higher or farther left.

(B) Display information or a display object such as an icon of a route network apparatus having a high certainty factor in a larger size.

(C) Display information or a display object such as an icon of a route network apparatus having a high certainty factor with a brighter color.

Incidentally, as examples of the display object of the route network apparatus, an icon, text and animation may be considered, but other items may be used so as long as it visually signifies the route network apparatus.

Moreover, in the screen display, upon calculating the number of reachable network apparatuses determined to be reachable based on the determination of reachability containing in the identified one or more route network apparatuses, if the number of the calculated reachable network apparatuses is two or more, the display object showing the two or more reachable network apparatuses may be grouped and displayed as a group display object. Incidentally, as an example of this group display object, a square, a square with round corners, or a circle may be considered as the display object of the two or more reachable route network apparatuses, but other display methods may be used so as long as it is possible to visually recognize the two or more reachable route network apparatuses. The display of the display object (for instance a line) showing the coupling relationship between the display objects implying the reachable route network apparatuses may be inhibited. This is preferable in cases when the management program 120 is to calculate the certainty factor without identifying the coupling relationship between the switch devices and displaying the result.

Moreover, in the screen display, if the first certainty factor if higher than the second certainty factor, a display object (for instance a line) representing that the first network apparatus is coupled from the group display object, and a display object (for instance a line) representing that the second route network apparatus is coupled from the group display object via the first route network apparatus may be displayed. Similarly, a display object (for instance a line) showing that the display object representing the management server 1 (or the management system) and a display object and the group display object are couple may be displayed.

<5. Variation>

In the foregoing explanation, the management server 1 conducted the communication test for determining the reachability at step S112 of FIG. 11, and, by providing a highly precise determination regarding the communication status from the management server 1 to the respective management target information processing apparatuses, the communication may be resumed for the management server 1 to once again monitor the respective management target information processing apparatuses.

In addition, as a result of performing the following modified examples, the management server 1 will be able to analyze the unreachable management target information processing apparatus (more preferably the L2 switch) regarding routes between the management target information processing apparatuses other than the routes from the management server 1 to the respective management target information processing apparatuses.

(A) At step S346, step S347, and step S348 of FIG. 6 that register information in the route information 112, the part of determining the registrability regarding the network interface of the management server 1 and the network interface of the target apparatus is modified to be the target. Specifically, in substitute for the management server 1, a second target apparatus list registering the management target information processing apparatuses which is similar to the target apparatus list is introduced, and it is determined whether the management target information processing apparatuses included in the target apparatus list and the management target information processing apparatuses included in the second target apparatus list are registered in the learning MAC address of the target switch.
(B) Implement the foregoing determination method from the management target information processing apparatuses included in the second target apparatus list at step S112 of FIG. 11.
(C) Replace the management server 1 with the management target information processing apparatuses included in the second target apparatus list in the screen of FIG. 15 and routine of FIG. 14.

Moreover, in the screen display method to the display device 2, if a bit pattern to be displayed on the screen is being sent from the management server 1 (for instance, display of receiving signals with the DSUB terminal or HMDI terminal), instead of sending the display information 211 (FIG. 16), a bit pattern corresponding to the display screen may be created, and electrical signals for displaying such bit pattern should be sent to the display device 2.

Incidentally, not all network apparatuses of the management LAN 3 need to be L2 switch devices. Moreover, even if it is an L2 switch device, it is also possible to send a request that is unique to a vendor from the management server 1, identify an adjacent L2 switch device based on the contents of the response, and use that information to identify the L2 switch device (or network apparatus) on the communication route from the management server 1 to the computer.

INDUSTRIAL APPLICABILITY

The present invention can be broadly applied to information processing system including a server computer, a network apparatus, and a storage apparatus.

The invention claimed is:
1. A management system for managing a plurality of management target information processing apparatuses including a plurality of network apparatuses and an information processing apparatus, comprising:
a network interface receiving management information from the network apparatuses and the information processing apparatus;
a processor determining the status of the information processing apparatus based on the management information;
a memory storing the status of the information processing apparatus; and
a display device displaying the status of the information processing apparatus,
wherein the network apparatuses include one or more switch devices, each of which transfers packets received by switch ports, to another network apparatus or the information processing apparatus, without changing destination MAC addresses of the packets,
wherein the processor calculates a first certainty factor concerning the certainty about a first route network apparatus contained in the one or more route network apparatuses being a cause of unreachability, based on processing results of:
(1) identifying one or more route network apparatuses on a communication route between the network interface and the first route network apparatus, based on (A) information acquired from some switch device, which includes MAC addresses of packets transferred by the some switch device with relations to the switch ports, (B) a MAC address of the network interface, and (C) a MAC address of the information processing apparatus; and
(2) determining one or more reachabilities of the one or more route network apparatuses, by communicating to the one or more route network apparatuses from the network interface, and
wherein the display device displays first information showing that communication from the network interface to the information processing apparatus is unreachable due to the first route network apparatus, and showing the first certainty factor as the certainty that the first route network apparatus is the cause of unreachability,
wherein the first certainty factor is calculated higher, if the first route network apparatus is unreachable, and
wherein the first certainty factor is calculated higher, if a certain network apparatus on a communication route between the network interface and the first route network apparatus is reachable.
2. A management system according to claim 1,
wherein the information acquired from the some switch device does not include information for identifying an adjacent switch device.
3. A management system according to claim 1,
wherein the processor calculates a second certainty factor concerning the certainty on whether a second route network apparatus contained in the one or more route network apparatuses being a cause of unreachability, based on processing results of:
(3) identifying another one or more route network apparatuses on a communication route between the network interface and the second route network apparatus, based on (A) the information acquired from some switch device, which includes a MAC address of a packet transferred by the some switch device with relations to the switch ports, (B) the MAC address of the network interface, and (C) the MAC address of the information processing apparatus; and
(2) determining another one or more reachabilities of the another one or more route network apparatuses, by communicating to the another one or more route network apparatuses from the network interface, and
wherein the display device displays second information showing that communication from the network interface to the information processing apparatus is unreachable due to the second route network apparatus with a lower visual priority than the first information, and showing the second certainty factor as the certainty that the second route network apparatus is the cause of unreachability.
4. A management system according to claim 3,
wherein as the displaying of the second information with the lower visual priority than the first information, the display device displays:
the second certainty factor or a second display object of the second route network apparatus, with a location which is right or down to the first certainty factor or a first display object of the first route network apparatus, if the second certainty factor is smaller than the first certainty factor.
5. A management system according to claim 3,
wherein as the displaying of the second information with the lower visual priority than the first information, the display device displays:
the second certainty factor or a second display object of the second route network apparatus, with larger than the first certainty factor or a first display object of the first route network apparatus, if the second certainty factor is smaller than the first certainty factor.

6. A management system according to claim 3,
wherein as the displaying of the second information with the lower visual priority than the first information, the display device displays:
the second certainty factor or a second display object of the second route network apparatus, with high degree of enhancement than the first certainty factor or a first display object of the first route network apparatus, if the second certainty factor is smaller than the first certainty factor.

7. A management system according to claim 3,
wherein the processor calculates the number of reachable network apparatuses included in the identified one or more route network apparatuses and determined as being reachable based on the reachability determination, and
wherein, if the number of the calculated reachable network apparatuses is two or more, the display device displays a group display object showing that display objects showing the two or more reachable network apparatuses have been grouped.

8. A management system according to claim 1,
wherein the network interface, the processor, the memory and the display device are included in one information processing apparatus.

9. A management system according to claim 1,
wherein the network interface, the processor, the memory and the display device are included in one information processing apparatus, and
wherein the display device is a display computer that performs display based on information sent from an LCD, a CRT or the one information processing apparatus for performing screen display according to signals sent from the one information processing apparatus.

10. A management system according to claim 7,
wherein, if the first certainty factor is higher than the second certainty factor, the display device displays a display object representing that the first network apparatus is coupled from the grouped two or more display objects, and a display object representing that the second route network apparatus is coupled from the grouped two or more display object via the first route network apparatus.

11. A management system according to claim 1,
wherein information showing whether it is unreachable from the management system to the information processing apparatus, identifying information of the first network apparatus, and display of the first certainty factor by the display device additionally displays that they are related to the reception of the management information.

12. An information processing system comprising:
a plurality of management target information processing apparatuses including a plurality of network apparatuses, a network interface, and an information processing apparatus; and
a management system managing the plurality of management target information processing apparatuses,
wherein the management system identifies one or more route network apparatuses as network apparatuses on a communication route of the network interface and the information processing apparatus from the plurality of network apparatuses,
wherein the identified one or more route network apparatuses each of which transfers packets received by switch ports, to another network apparatus or the information processing apparatus, without changing destination MAC addresses of the packets,
wherein the management system calculates a first certainty factor concerning the certainty about a first route network apparatus contained in the one or more route network apparatuses being a cause of unreachability, based on processing results of:
(1) identifying one or more route network apparatuses on a communication route between the network interface and the first route network apparatus, based on (A) information acquired from some switch device, which includes MAC addresses of packets transferred by the some switch device with relations to the switch ports, (B) a MAC address of the network interface, and (C) a MAC address of the information processing apparatus; and
(2) determining one or more reachabilities of the one or more route network apparatuses, by communicating to the one or more route network apparatuses from the network interface, and
wherein the management system displays first information showing that communication from the network interface to the information processing apparatus is unreachable, and the first certainty factor as the certainty that the first route network apparatus is the cause of unreachability,
wherein the first certainty factor is calculated higher, if the first route network apparatus is unreachable, and
wherein the first certainty factor is calculated higher, if a certain network apparatus on a communication route between the network interface and the first route network apparatus is reachable.

13. An information processing system according to claim 12, the management system calculates a second certainty factor concerning the certainty on whether a second route network apparatus contained in the one or more route network apparatuses being a cause of unreachability, based on processing results of:
(3) identifying another one or more route network apparatuses on a communication route between the network interface and the second route network apparatus, based on (A) the information acquired from some switch device, which includes a MAC address of a packet transferred by the some switch device with relations to the switch ports, (B) the MAC address of the network interface, and (C) the MAC address of the information processing apparatus; and
(2) determining another one or more reachabilities of the another one or more route network apparatuses, by communicating to the another one or more route network apparatuses from the network interface, and
wherein the display device displays second information showing that communication from the network interface to the information processing apparatus is unreachable due to the second route network apparatus with a lower visual priority than the first information, and showing the second certainty factor as the certainty that the second route network apparatus is the cause of unreachability.

14. A non-transitory computer readable medium storing a program for performing a method for operating a management system for managing a plurality of management target information processing apparatuses including a plurality of network apparatuses and an information processing apparatus, the management system comprising a network interface receiving management information from the network apparatuses and the information processing apparatus, and a processor determining the status of the information processing apparatus based on the management information, wherein the network apparatuses include one or more switch devices, each of which transfers packets received by switch ports, to another network apparatus or the information processing apparatus, without changing destination MAC addresses of the packets, the program when executed by a computer, performing the method of:

storing the status of the information processing apparatus;

displaying the status of the information processing apparatus;

calculating a first certainty factor concerning the certainty about a first route network apparatus contained in the one or more route network apparatuses being a cause of unreachability, based on processing results of:

(1) identifying one or more route network apparatuses on a communication route between the network interface and the first route network apparatus, based on (A) information acquired from some switch device, which includes MAC addresses of packets transferred by the some switch device with relations to the switch ports, (B) a MAC address of the network interface, and (C) a MAC address of the information processing apparatus; and (2) determining one or more reachabilities of the one or more route network apparatuses, by communicating to the one or more route network apparatuses from the network interface; and displaying first information showing that communication from the network interface to the information processing apparatus is unreachable due to the first route network apparatus, and showing the first certainty factor as the certainty that the first route network apparatus is the cause of unreachability, wherein the first certainty factor is calculated higher, if the first route network apparatus is unreachable, and wherein the first certainty factor is calculated higher, if a certain network apparatus on a communication route between the network interface and the first route network apparatus is reachable.

15. A non-transitory computer readable medium according to claim 14, wherein the method further comprises:

calculating a second certainty factor concerning the certainty on whether a second route network apparatus contained in the one or more route network apparatuses being a cause of unreachability, based on processing results of:

(3) identifying another one or more route network apparatuses on a communication route between the network interface and the second route network apparatus, based on (A) the information acquired from some switch device, which includes a MAC address of a packet transferred by the some switch device with relations to the switch ports, (B) the MAC address of the network interface, and (C) the MAC address of the information processing apparatus; and (2) determining another one or more reachabilities of the another one or more route network apparatuses, by communicating to the another one or more route network apparatuses from the network interface, and displaying second information showing that communication from the network interface to the information processing apparatus is unreachable due to the second route network apparatus with a lower visual priority than the first information, and showing the second certainty factor as the certainty that the second route network apparatus is the cause of unreachability.

16. A non-transitory computer readable medium according to claim 15, wherein as the displaying of the second information with the lower visual priority than the first information, there is displayed:

the second certainty factor or a second display object of the second route network apparatus, with a location which is right or down to the first certainty factor or a first display object of the first route network apparatus, if the second certainty factor is smaller than the first certainty factor.

17. A non-transitory computer readable medium according to claim 15, wherein as the displaying of the second information with the lower visual priority than the first information, there is displayed:

the second certainty factor or a second display object of the second route network apparatus, with larger than the first certainty factor or a first display object of the first route network apparatus, if the second certainty factor is smaller than the first certainty factor.

18. A non-transitory computer readable medium according to claim 15, wherein as the displaying of the second information with the lower visual priority than the first information, there is displayed:

the second certainty factor or a second display object of the second route network apparatus, with high degree of enhancement than the first certainty factor or a first display object of the first route network apparatus, if the second certainty factor is smaller than the first certainty factor.

19. A non-transitory computer readable medium according to claim 15, wherein, if the first certainty factor is higher than the second certainty factor, displaying a display object representing that the first network apparatus is coupled from the grouped two or more display objects, and a display object representing that the second route network apparatus is coupled from the grouped two or more display object via the first route network apparatus.

20. A non-transitory computer readable medium according to claim 14, wherein information showing whether it is unreachable from the management system to the information processing apparatus, identifying information of the first network apparatus, and display of the first certainty factor by the display device additionally displays that they are related to the reception of the management information.

* * * * *